United States Patent
Rorabaugh et al.

[11] Patent Number: 5,876,652
[45] Date of Patent: Mar. 2, 1999

[54] METHOD FOR IMPROVING PULLOFF STRENGTH IN PIN-REINFORCED SANDWICH STRUCTURE

[75] Inventors: Michael E. Rorabaugh, Seattle; Anthony Falcone, Kent, both of Wash.

[73] Assignee: The Boeing Company, Seattle, Wash.

[21] Appl. No.: 874,236

[22] Filed: Jun. 13, 1997

Related U.S. Application Data

[62] Division of Ser. No. 628,879, Apr. 5, 1996, abandoned.

[51] Int. Cl.$^6$ ............................. B29C 43/18; B29C 43/20
[52] U.S. Cl. ...................... 264/258; 29/432; 29/897.31; 264/321
[58] Field of Search .................... 428/223, 304.4, 428/318.4, 319.3; 442/370, 373; 156/148; 29/897, 897.31, 897.34, 423, 432, 525; 264/258, 321

[56] References Cited

U.S. PATENT DOCUMENTS

| | | | |
|---|---|---|---|
| 2,762,739 | 9/1956 | Weiss | 428/304.4 |
| 4,196,251 | 4/1980 | Windecker | 428/311.5 |
| 4,489,123 | 12/1984 | Schiive et al. . | |
| 4,808,461 | 2/1989 | Boyce et al. . | |
| 5,041,321 | 8/1991 | Bendig . | |
| 5,102,723 | 4/1992 | Pepin | 428/223 |
| 5,186,776 | 2/1993 | Boyce et al. . | |
| 5,376,598 | 12/1994 | Preedy et al. . | |
| 5,441,682 | 8/1995 | Baker et al. . | |
| 5,445,861 | 8/1995 | Newton et al. . | |
| 5,466,506 | 11/1995 | Freitas et al. . | |
| 5,589,015 | 12/1996 | Fusco et al. . | |
| 5,624,622 | 4/1997 | Boyce et al. | 264/258 |

FOREIGN PATENT DOCUMENTS

| | | |
|---|---|---|
| 2129931A | 11/1972 | France . |
| 2718670A | 10/1995 | France . |
| WO 95 03170A | 2/1995 | WIPO . |

OTHER PUBLICATIONS

Horsch, "Dreidimensionale Verstackungsmaterialien fuer Faserverbundwerkstoffe," Kunstoffe, vol. 80, No. 9, (Sept. 1990), pp. 1003–1007.

Primary Examiner—James J. Bell
Assistant Examiner—Blaine Copenheaver
Attorney, Agent, or Firm—John C. Hammar

[57] ABSTRACT

Improved pin-reinforced sandwich structure ties the face sheets (typically on opposite sides of a foam core) together with a plurality of Z-pins that extend into each face sheet (through the core). The pins are arranged in a tetrahedral or hat section configuration in 2-dimensional or 3-dimensional arrangements to provide enhanced reinforcement, particularly in shear. We are able to improve the pulloff strength additionally by dimpling the core surrounding the pins to produce adhesive fillets along the pins.

19 Claims, 2 Drawing Sheets

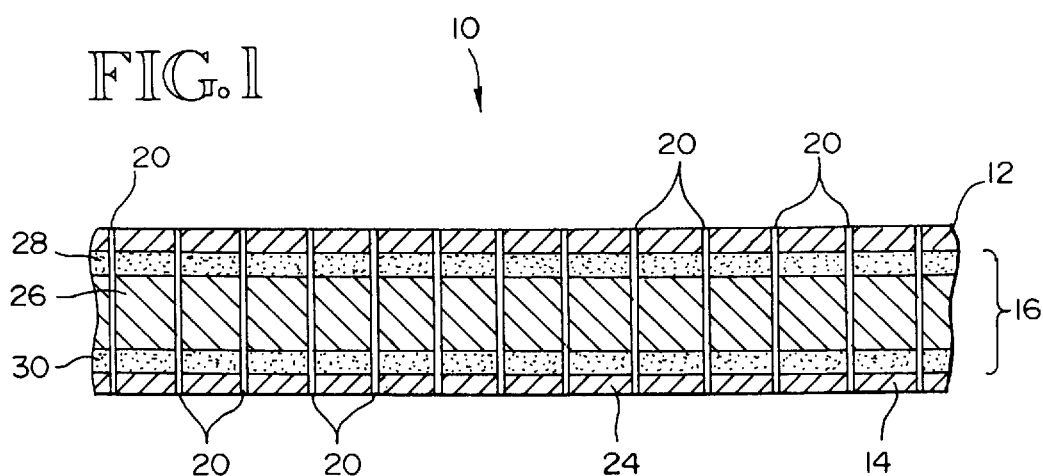
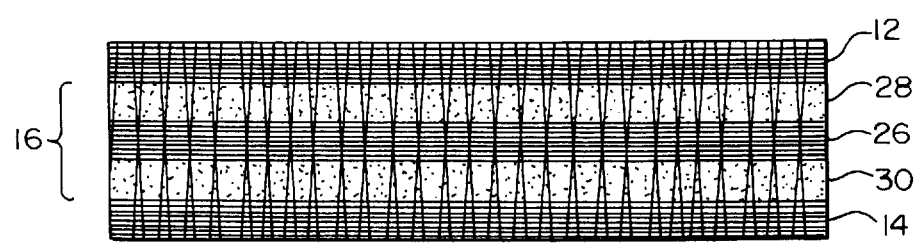
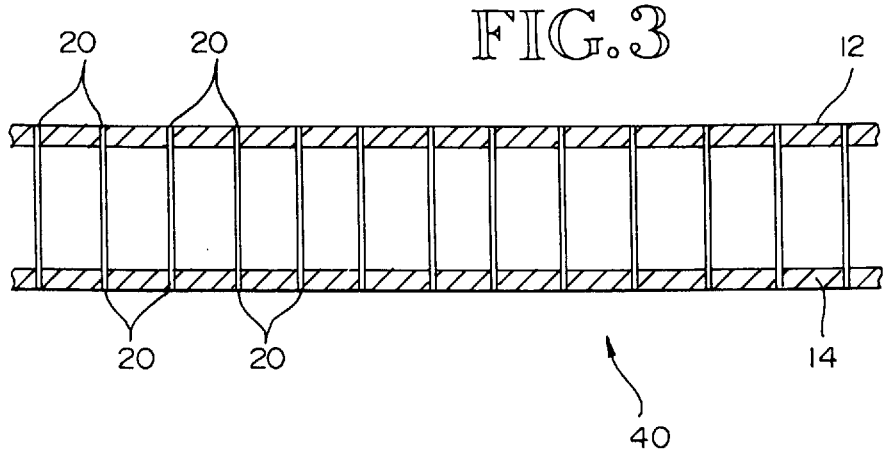

METHOD FOR IMPROVING PULLOFF STRENGTH IN PIN-REINFORCED SANDWICH STRUCTURE

REFERENCE TO RELATED APPLICATIONS

The present application is a divisional application based upon U.S. patent application Ser. No. 08/628,879, filed Apr. 5, 1996, now abandoned.

TECHNICAL FIELD

The present invention relates to composite sandwich structures, and, more particularly, to Z-pinned structures having off-normal (i.e., angled) pins in tetrahedral or hat section configurations to improve shear (pulloff) strength.

BACKGROUND ART

Composite sandwich structures having resin matrix skins or face sheets adhered to a honeycomb or foam core are used in aerospace, automotive, and marine applications for primary and secondary structure. The face sheets typically are reinforced organic matrix resin composites, made from fiberglass, carbon, ceramic, or graphite fibers reinforcing a thermosetting or thermoplastic matrix resin. The face sheets carry the applied loads, and the core transfers the load from one face sheet to the other or absorbs a portion of the applied load. In either case, it is important that all layers of the structure remain rigidly connected to one another. Noise suppression sandwich structure or sandwich structures for other applications are described in U.S. Pat. No. 5,445,861, which we incorporate by reference.

Keeping the face sheets adhered to the foam is problematic. For simplicity, we will refer to a foam core sandwich structure as an example. The most common source of delamination stems from a relatively weak adhesive bond that forms between the face sheets and the foam core. That is, pulloff strength of the face sheets in shear is low. Efforts to strengthen the bond have generally focused on improving the adhesive, but those efforts have had limited success.

Delamination can arise from differences in the coefficient of thermal expansion (CTE) of the different material layers. As a result, as temperatures oscillate, the face sheet or foam may expand or contract more quickly than its adjoining layer. In addition to causing layer separation, CTE differences can significantly distort the shape of a structure, making it difficult to maintain overall dimensional stability. Conventional sandwich structure optimizes the thickness of a structure to meet the weight and/or space limitations of its proposed application. Sandwich structures are desirable because they are usually lighter than solid metal or composite counterparts, but they may be undesirable if they must be larger or thicker to achieve the same structural performance. Providing pass-throughs (i.e., holes), which is relatively easy in a solid metal structure by simply cutting holes in the desired locations, is more difficult in a composite sandwich structure because holes may significantly reduce the load carrying capability of the overall structure.

Foster-Miller has been active in basic Z-pin research. U.S. Pat. No. 5,186,776 describes a technique for placing Z-pins in composite laminates involves heating and softening the laminates with ultrasonic energy with a pin insertion tool which penetrates the laminate, moving fibers in the laminate aside. The pins are inserted either when the insertion tool is withdrawn or through a barrel in the tool prior to its being withdrawn. Cooling yields a pin-reinforced composite. U.S. Pat. No. 4,808,461 describes a structure for localized reinforcement of composite structure including a body of thermally decomposable material that has substantially opposed surfaces, a plurality of Z-pin reinforcing elements captured in the body and arranged generally perpendicular to one body surface. A pressure plate (i.e., a caul plate) on the other opposed body surface drives the Z-pins into the composite structure at the same time the body is heated under pressure and decomposes. We incorporate U.S. Pat. Nos. 4,808,461 and 5,186,776 by reference.

A need exists for a method of forming a sandwich structure that (1) resists distortion and separation between layers, in particular, separation of the face sheets from the core; (2) maintains high structural integrity; (3) resists crack propagation; and (4) easily accommodates the removal of portions of core, as required by specific applications. The method should allow the structure to be easily manufactured and formed into a variety of shapes. In U.S. patent application Ser. No. 08/582,297 pending entitled "Pin-Reinforced Sandwich Structure", which we incorporate by reference, Jamie Childress of Boeing described such a method of forming a pin-reinforced foam core sandwich structure. The Childress method positions face sheets of uncured fiber-reinforced resin (i.e., prepreg or B-stage thermoset) on opposite sides of a foam core. The core has at least one compressible sublayer and contains a plurality of Z-pins spanning the foam between the face sheets. Childress inserts the Z-pins into the face sheets during autoclave curing of the face sheet resin when a compressible sublayer is crushed and the back pressure applied through the caul plate or other suitable means drives the Z-pins into one or both of the face sheets to form a pin-reinforced foam core sandwich structure. By removing some of the foam core by dissolving, eroding, melting, drilling, or the like to leave a gap between the face sheets, Childress produces his corresponding column core structure.

As Childress described, the foam core generally is itself a sandwich that includes a high density foam sublayer, and at least one low density, compressible or crushable foam sublayer. The preferred arrangement includes a first and second low density foam sublayers sandwiching the high density sublayer. The plurality of Z-pins are placed throughout the foam core in a regular array normal to the surface or slightly off-normal at an areal density of about 0.375 to 1.50% or higher, as appropriate, extending from the outer surface of the first low density foam sublayer through to the outer surface of the second low density foam sublayer. Expressed another way with respect to the arrangement of the pins, Childress typically used 40–50 pin/in$^2$ or more. Preferably, the Childress foam sublayers are polyimide or polystyrene, the Z-pins are stainless steel or graphite, and the face sheets are fiber-reinforced, partially cured or pre-cured thermosetting or thermoplastic resin composites.

In U.S. Pat. No. 5,589,016, Hoopingarner et al. describe a honeycomb core composite sandwich panel having a surrounding border element (i.e., a "closeout") made of rigid foam board. The two planar faces of the rigid foam board are embossed or scored with a pattern of indentations usually in the form of interlinked equilateral triangles. The indentations are sufficiently deep and sufficient in number to provide escape paths for volatiles generated inside the panel during curing and bonding of the resin in the face sheets to the honeycomb core and peripheral foam. The scoring prevents the development of excessive pressure between the face sheets in the honeycomb core that otherwise would interfere with the bonding. We incorporate this application by reference.

We achieve increased pulloff strength in pin-reinforced sandwich structure by a regular ordering of the Z-pins into ordered structural configurations or with resin fillets, or both, in accordance with the present invention.

SUMMARY OF THE INVENTION

We have discovered two ways to increase the pulloff strength in foam core sandwich structure. First, we can form resin fillets around the fiber/resin interfaces at the contact faces of the foam core by dimpling the foam to create a fillet pocket prior to resin flow during curing. Second, we can arrange the pins in an ordered fashion such as a tetrahedral configuration or a hat section configuration. In tetrahedral or hat section configurations, the pins not only provide a tie between the two skins but they also provide miniature structural support suited better for load transfer than normal or random off-normal (interlaced) or less ordered pin configurations. With our ordering, we can produce anisotropic properties if we choose.

BRIEF DESCRIPTION OF THE DRAWINGS

FIG. 1 is a schematic sectional view of pin-reinforced foam core sandwich structure.

FIG. 2 is a schematic sectional view of sandwich structure having interlaced Z-pins.

FIG. 3 is a schematic sectional view of column core structure.

DETAILED DESCRIPTION OF A PREFERRED EMBODIMENT

Figure 4:
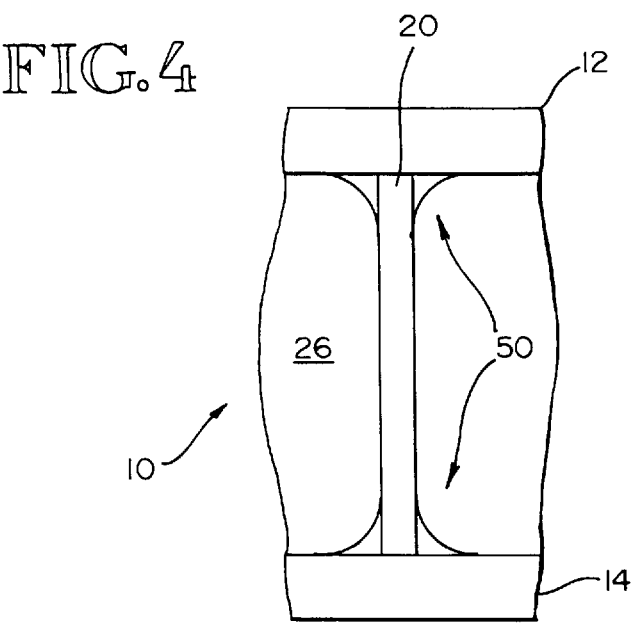
FIG. 4 is a schematic sectional view of resin fillets on the fibers to enhance pulloff strength in sandwich structure.

FIG. 1 shows pin-reinforced foam core sandwich structure 10 after curing. Additional details on this fundamental Z-pinned sandwich structure are provided in the Childress application to which we referred earlier, U.S. patent application Ser. No. 08/582,297, pending "Pin-Reinforced Sandwich Structure". The preliminary structure includes the foam core 16 and the plurality of Z-pins 20 that are oriented normal to the plane of the foam core 16, and that extend through the foam core 16 and face sheets 12, 14 from one outer surface 22 to the opposed outer surface 24.

In FIG. 2, the Z-pins are angled to the face plane of the foam core 16. Angles even as great as 45° work with some materials. Angled Z-pins work particularly well for reinforcing face sheets around bolt holes, because they help to restrict the face sheets from cracking. The interlaced Z-pins are optimally inserted at both plus and minus angles with the pins being skew to both the X-Z and Y-Z planes. The precise orientation of the Z-pins will vary according to the needs of the particular application. Generally the pin areal density is about 0.75% (with interlaced pins or with normal pins), which means for 20 mil diameter pins that the pins are about 0.125-inches apart. Expressed another way, we typically use 40–50 pins/in². If the pins are angled, they form tiny trusses between the skins and their length and spacing is a function of the truss angle, as those of ordinary skill will understand. We believe that precisely ordering the pin configuration, however, will provide the best performance, and suggest tetrahedral or hat section configurations. The ordering can be along a single axis, which will produce an anisotropic material, or along both the X and Y axes simultaneously to produce an isotropic material.

The first and second face sheets 12, 14 are positioned adjacent the foam core 16, one face sheet touching each foam core outer surface 22, 24. We generally use a layer of adhesive to attach adjoining layers. We form the pin-reinforced foam core 16 using known methods (e.g., stitching or needling) or purchase it from companies such as Foster-Miller, Inc., in Waltham, Mass.

The core 16 in FIGS. 1 and 3 is a closed cell foam that includes three sublayers: a high density central sublayer 26 and first and second low density, crushable foam sublayers 28, 30, one located on each side of the high density foam sublayer 26. While three layers are shown, it is to be understood that the foam core 16 may be composed of any number of sublayers depending on the particular application. For example, the foam core may be a single low density sublayer; or, it may be a stack of alternating low density and high density sublayers. The foam core 16 should be crushable during autoclave curing to permit the pins to extend into the face sheets. Low density polyimide (e.g., Rohacel™) or low density polystyrene (e.g., Styrofoam™) foams are the presently preferred low density sublayer materials, since they are easy to form and do not require extremely high temperatures or pressures to crush during autoclave curing. The low density sublayer may decompose at the autoclave temperatures.

If a high density sublayer 26 is included, it usually should be made of a material that will not crush during autoclave curing. Obviously, the precise temperatures and pressures to be used during autoclave curing will affect the selection of the material used to form the high density sublayer. Further considerations to be taken into account when selecting an appropriate high density sublayer material include whether the high density sublayer is to be removed after autoclave processing and the preferred method for removing it. Typically it is high density polystyrene or polyimide foam. It might be (i) syntactic foam having internal reinforcing spheres, (ii) a fiber-reinforced resin prepreg or composite, (iii) a fiberform or microform ceramic such as described in U.S. Pat. Nos. 5,376,598; 5,441,682; and 5,041,321 or in copending U.S. patent applications Ser. No. 08/209,847, pending or 08/460,788, now allowed (iv) a metal foil, (v) a metal foil/adhesive laminate of the type described in U.S. Pat. No. 4,489,123 or U.S. patent application Ser. No. 08/585,304, pending entitled, "Titanium-Polymer Hybrid Laminates", or (vi) a foam-filled honeycomb core. The central sublayer 26 might also be a honeycomb core with the cells arranged normal to the plane of the face sheets as typical for sandwich structure, but such structure typically would not benefit greatly from Z-direction fiber reinforcement.

The Z-pins 20 may be any suitably rigid material, e.g., stainless steel, titanium, copper, graphite, epoxy, composite, glass, carbon, or the like. The Young's modulus of elasticity for the Z-pins is generally greater than $10^7$. Additionally, the Z-pins may be barbed, where appropriate, to increase their holding strength in the face sheets.

The face sheets 12, 14 are, in the case of thermosets, preferably formed of a partially cured fiber-reinforced composite material. We can use thermosetting composite face sheets that are not significantly cured beyond B-stage (i.e., minimal cross-linking has occurred between resin molecules; the resin can still flow.) If composites are used as face sheets, the effect that the autoclave cure cycle will have on the face sheets needs to be considered to determine and, then, to follow the optimal temperature/pressure autoclave cure regime. The present invention probably will not work with fully cured thermosetting composite face sheets because they are too hard to force pins into.

Suitable reinforcing fibers include glass, graphite, arimide, ceramic, carbon and the like. Suitable resins include epoxy, bismaleinide, polyimide, phenolic, or the like. (Virtually any thermoplastic or thermoset resin will suffice.)

Various procedures are available for laying up the composite face sheets. Since such procedures are generally known to those skilled in the art, they are not described here. Although thick, metal sheets do not work well as face sheets, we can use metal foil or metal foil/resin laminated composites. The metal foil in such cases might be welded to metallic Z-pins in the fashion described in copending U.S. patent application Ser. No. 08/619,957, now allowed, to J. Childress entitled "Composite / Metal Structural Joint with Welded Z-Pins." Metal foil/resin laminated composites are described in U.S. Pat. No. 4,489,123 and U.S. patent application No. 08/585,304, pending which we incorporate by reference.

Autoclave curing involves placing a structure in a vacuum bag, performing controlled heating and pressurizing of the contents within the bag, and removing the contents following specific temperature/pressure cycle. The pressure produced during autoclave curing presses the face sheets 12, 14 toward one another and the heat cures the resin. The pressure causes the low density sublayer to crush, thus driving the Z-pins 20 into both face sheets 12, 14. The high density sublayer, if present, remains intact and acts as a support for holding the Z-pins 20 as they are pushed into the face sheets.

Those skilled in the autoclave curing art will understand that the particulars of the autoclave curing regime will vary according to the materials used and the results desired. The use of partially cured composite face sheets will obviously effect the time, and possibly the pressure, required to produce the desired result, i.e., drive the pins through the face sheets. As an example, Childress obtained acceptable results (i.e., produced usable structure) using:

partially cured 0.080 inch thick face sheets formed of graphite fibers and 350° F.-cure epoxy;

two 0.100 inch thick low density sublayers formed of 5 lbs/ft³ density polyimide foam;

a 0.210 inch thick high density sublayer formed of 20 lbs/ft³ density polyimide foam;

and a plurality of 0.020 inch diameter stainless steel Z-pins spaced 0.25 inches from each other.

He placed the preform structure in a vacuum pressure bag at ambient temperature (72° F.); evacuated the bag; heated the bag at 5° F./min in an autoclave with a pressure of 20 psi until he reached 350° F. He maintained the temperature and pressure for 2 hours before cooling at 5° F./min until ambient temperature. Then he reduced the pressure to ambient, and removed the completed part from the bag. The first and second low density layers crushed and the pins were driven through the face sheets. Typically, an autoclave curing cycle raises the pressure above 20 psi after the cure temperature has been reached. Pressures above 20 psi might crush the 0.210 inch thick high density polyimide sublayer.

Childress also obtained acceptable results using the same components and autoclave curing steps as the first example, except we used 10 lbs/ft³ polystyrene as the low density sublayer, 40 lbs/ft³ polystyrene for the high density sublayer, and a maximum cure temperature of 250° F.

The thickness of the face sheets 12, 14 and foam core 16 may vary. We have obtained acceptable results using foam cores of between 0.125 and 1.25 inches thick. Exemplary face sheet thicknesses for a graphite/epoxy range between about 0.050 to 0.080 inches. Using thin face sheets has the advantage of requiring that the low density sublayer only crush over a corresponding small dimension to drive the Z-pins through the face sheets. Exemplary Z-pin thicknesses are between 0.010 to 0.030 inches in diameter, typically regularly spaced between 0.0625 to 0.25 inches from each other. The dimensions discussed can vary greatly depending on the application intended for the resulting structure, the materials used to form the structure, and the specific autoclave curing cycle.

Any Z-pins 20 that protrude beyond the outer surface of the face sheet may be shaved off flush with the surface using standard milling practices, e.g., planes, grinders, sanders, and the like. Preferably the pressurizing mechanism used by the autoclave curing system will include pressing surfaces that cover the entire outer surface of the face sheets. Using such all-covering pressing surfaces prohibits the Z-pins 20 from sticking out beyond the outer surface of the face sheets, and thus, eliminates the step of having to shave them off. The present invention also encompasses using an autoclave curing cycle that drives the Z-pins 20 only part way through the face sheets.

For applications requiring a hollow space or gap between the face sheets 12, 14, the foam core 16 may be partially or fully removed from the sandwich structure to form a column core structure 40. (FIG. 3) The method of removal will depend upon the materials selected for the foam core 16. For example, we can dissolve the foam sublayers using a solvent, such as methylethyl ketone (MEK). Other methods to remove the sublayer include erosion, melting, acid digestion, thermal decomposition, drilling, laser cutting, or the like. FIG. 3 is a schematic cross-sectional view of a column core sandwich structure where the foam core 16 has been entirely removed.

We use pin-reinforced core sandwich structure 10 and column core structure 40 in a variety of structural aerospace applications. The column structure is particularly adapted for use in actively-cooled circuit boards, actively-cooled electronics racks, and anti-icing leading edge structures, where a heat transfer fluid is circulated in the gap between the outer face sheets.

Pin-reinforced foam core sandwich structure has high structural integrity that resists deformation and face sheet separation by using a plurality of Z-pins to transfer loads between face sheets. The sandwich structure is easy to form and has a wide range of uses. The risk of face sheet separation due to variations in CTE between materials is greatly reduced, since the pins continuously hold the face sheets in proper alignment. The need to remove portions of the structure may be easily accommodated without compromising the structural integrity of the article, since the pins remain embedded in the face sheets even after sublayer removal.

The size and number of layers, their chemical composition, and the particulars of the autoclave curing regime will vary greatly from one application to another.

As shown in FIG. 4, we have discovered that we can improve pulloff strength by forming resin fillets 50 around each pin 20 at the face sheet/core interface. The fillets 50 form when the resin flows during cure by filling dimples formed into the foam core 26 around each pin 20. For best results, we believe that the face sheets should be resin-rich during layup so that fillet flow will not deplete the laminates. We can also adhesively bond fully cured face sheets to a pin reinforced, dimpled core by applying the adhesive between the face sheet and core and, then, curing the adhesive. The fillets 50 make the skin/core interface three-dimensional rather than planar.

Figure 5:
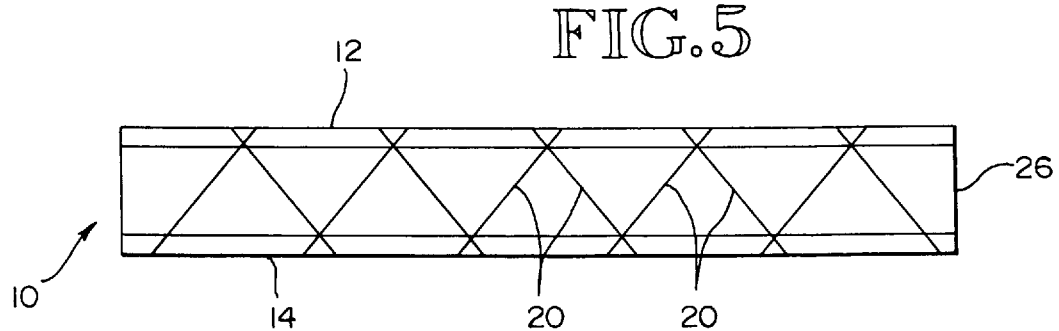
FIG. 5 is a schematic sectional view showing a tetrahedral configuration for the Z-pins.
Figure 6:
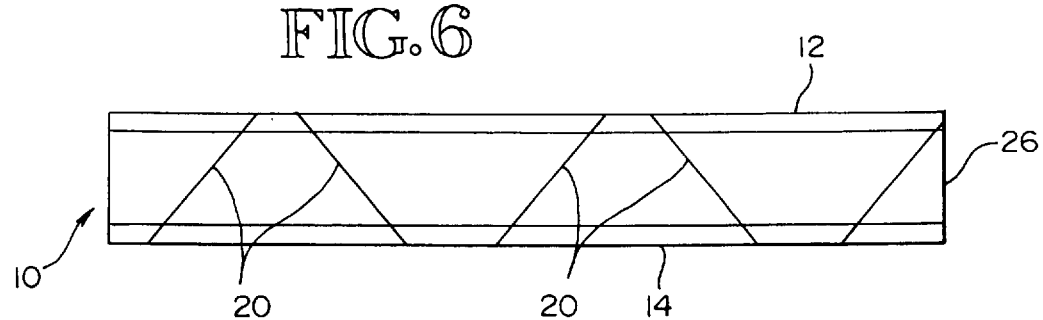
FIG. 6 is a schematic sectional view showing a hat section configuration for the Z-pins.

In FIGS. 5 and 6 we illustrate our preferred pin configurations to maximize pulloff and compressive strength. FIG. 5 shows a tetrahedral configuration where pins 20 form pyramids between the face sheets 12, 14. FIG. 6 shows a hat section configuration where the pins form truncated pyramids. The primary difference between the tetrahedral and the hat section configuration is the lateral spacing of the pins. In the hat section, the angled pins simply are spaced further apart than in the tetrahedral configuration. A tetrahedral or hat section configuration improves load transfer between the face sheets because the load paths match conventional designs for large-scale load transfer. If we elect to order the pins along one axis (for example, the X-Z plane) while leaving them normal to the surface along the other axis, we produce a structure having trusses in the X-Z plane spaced apart in regular array, like a cornfield. In the anisotropic material having a Z-dimensional ordering, the pins are parallel to either the X-Z or Y-Z plane. In the 3-dimensional material, the pins are skew to both the X-Z and Y-Z planes. This Z-dimensional structure will have higher pulloff strength in the X-direction than in the Y-direction because of the trusses.

We can use resin fillets together with ordered pin placement. That is, we can dimple the core around each pin in the tetrahedral or hat section configuration.

As described in U.S. Pat. No. 5,736,222, "Interlaced Z-pin Structures," off-normal pins provide load paths in the "zero" plys in the composite, especially around bolt holes.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples illustrate the invention and are not intended to limit it Accordingly, define the invention with the claims and limit the claims only as necessary in view of the pertinent prior art.

We claim:

1. A method for increasing the pulloff strength in pin-reinforced sandwich structure, comprising the step of:

ordering the pins into a tetrahedral or hat section configuration to increase the pulloff strength between facesheets of the structure and a core to which the facesheets are adhered.

2. The method of claim 1 wherein the core is foam and the pins are individual and discrete.

3. The method of claim 2 wherein the foam is polystyrene or polyimide.

4. The method of claim 2 wherein the foam has layers having different density.

5. The method of claim 1 wherein the configuration is hat section.

6. The method of claim 1 wherein the configuration is tetrahedral.

7. The method of claim 1 wherein there are about 40–50 pins/in$^2$.

8. The method of claim 1 wherein the areal density of pins about 0.375–1.50%.

9. The method of claim 1 wherein the core includes a foam, syntactic foam, composite, ceramic, metal foil-adhesive hybrid laminate, or foam-filled honeycomb.

10. A method for increasing the pulloff strength in pin-reinforced sandwich structure, comprising the step of:

dimpling a core in the sandwich structure adjacent to and surrounding each pin to allow resin in a facesheet adhered to the core to form resin fillets at each dimple in the core, the dimples improving the pulloff strength between the facesheet and the core.

11. The method of claim 10 wherein the sandwich structure includes fiber reinforced, resin composite facesheets sandwiching the core and further comprising the step of:

ordering the pins into a tetrahedral or hat section configuration to extend from one facesheet through the core and into the other facesheet.

12. The method of claim 11 wherein the configuration is tetrahedral, the pins include carbon fibers, and the areal density of pins is about 0.375–1.50%.

13. The method of claim 11 wherein the configuration is hat section, the pins include carbon fibers, and the areal density of pins is about 0.375–1.50%.

14. The method of claim 10 wherein the pins are individual, discrete carbon fibers.

15. The method of claim 14 wherein the core is foam.

16. The method of claim 15 wherein the foam is polystyrene or polyimide.

17. The method of claim 10 wherein there are about 40–50 pins/in$^2$.

18. The method of claim 10 wherein the areal density of pins is about 0.375–1.50%.

19. The method of claim 10 wherein the facesheets are resin rich so that formation of the fillets does not deplete resin in the facesheets.

* * * * *